Aug. 21, 1956   R. I. VAN NICE   2,760,085
FLIP-FLOP ELEMENT FOR CONTROL SYSTEMS
Filed June 24, 1955

WITNESSES
Robert C. Baird
Leon M. Garman

INVENTOR
Robert I. Van Nice.
BY
ATTORNEY

United States Patent Office 2,760,085
Patented Aug. 21, 1956

2,760,085

FLIP-FLOP ELEMENT FOR CONTROL SYSTEMS

Robert I. Van Nice, Glenshaw, Pa., assignor to Westinghouse Electric Corporation, East Pittsburgh, Pa., a corporation of Pennsylvania Application June 24, 1955, Serial No. 517,790

8 Claims. (Cl. 307—88)

The invention relates generally to control systems and, more particularly, to flip-flop elements for control systems.

An object of the invention is to provide for continuing an output, at will, from a flip-flop element of a control system irrespective of whether or not the input signal continues to be delivered.

It is also an object of the invention to provide a flip-flop element of a control system having a feedback circuit for effecting the delivery of an output when the hold circuit is energized in conjunction with the circuit for delivering the "on" signal or the feedback circuit.

Other objects of the invention will, in part, be obvious and will, in part, appear hereinafter.

The invention accordingly comprises the features of construction, combination of elements and arrangement of parts which will be exemplified in the system hereinafter set forth, and the scope of the application of which will be indicated in the claims.

Figure 1:
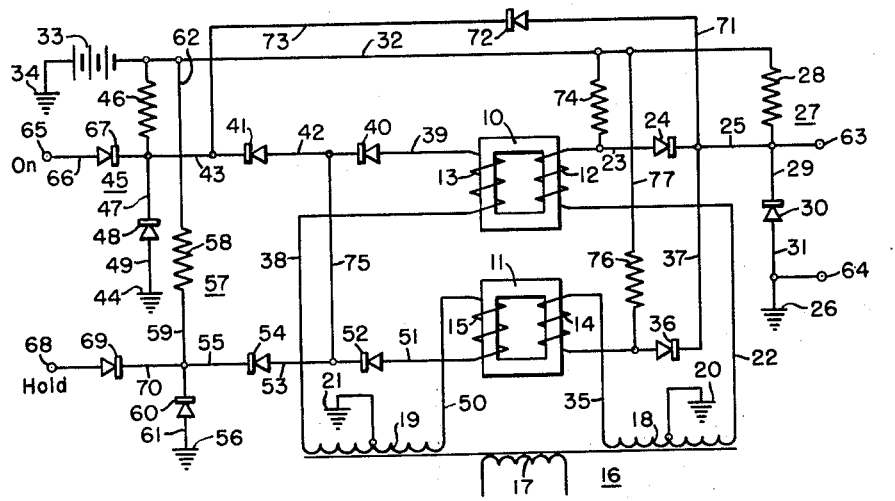
Figure 2:
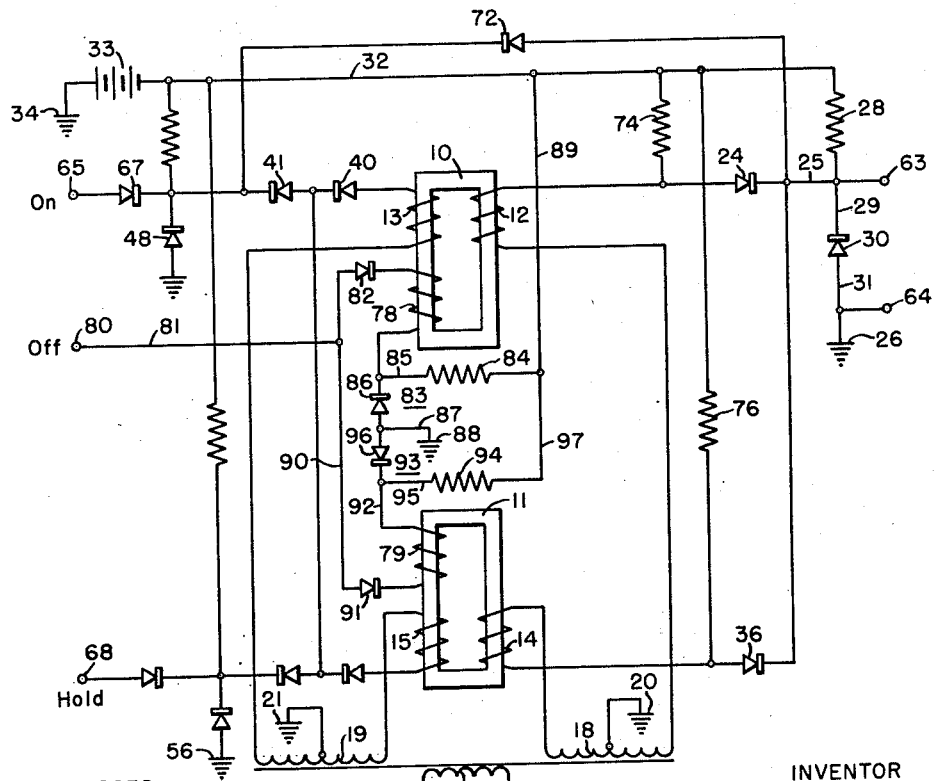

For a fuller understanding of the nature and objects of the invention, reference may be had to the following detailed description taken in connection with the accompanying drawing, in which:

Figure 1 is a diagram of the circuit connections of a flip-flop element embodying the features of the invention, and Fig. 2 is a circuit diagram of a modification of the invention illustrated in Fig. 1.

Referring now to the drawing, the flip-flop element for a control system illustrated in Fig. 1 comprises two core members 10 and 11, each of which is provided with a plurality of windings for performing functions to be described in detail hereinafter. The core members 10 and 11 will be made of some suitable laminated material such as nickel steel. However, it is to be understood that other materials may be utilized depending on the requirements of design.

In this embodiment of the invention the core 10 is provided with a gating winding 12 and a reset winding 13. The core 11 is provided with a gating winding 14 and a reset winding 15. The size of the conductor utilized and the number of turns in these windings and the disposition on the cores is also a matter of design.

A source of power, such as the transformer shown generally at 16, is provided with a primary winding 17 and secondary windings 18 and 19. The voltage employed will depend on the specifications for the system to be designed. In working with this system a secondary voltage of 20 volts or 10 volts on each side of the center tap for the resetting circuits and 30 volts or 15 volts on each side of the center tap for the gating circuits has been found to be satisfactory.

A number of non-linear devices are employed with the circuits to be described and traced hereinafter. The non-linear devices are so disposed in relationship to the circuits that they permit the flow of predetermined magnetizing currents to the coils or windings on the core members without any appreciable voltage drop and they protect the circuits and apparatus from excessive current flow. Further, as the description proceeds and the circuits are traced, it will seem that the electric currents flow through the rectifiers or diodes of the non-linear devices in the backward or reverse direction; however, what actually happens is that there is a reduction in the current flow in the forward direction. This reduction in the current flow may be predetermined by design to give the performance of functions required from the control system of which the flip-flop element is a part.

In order to explain this embodiment of the flip-flop element for a control system the circuits will now be traced and the functioning of the invention will be revealed as the specification proceeds. As the circuits are traced, the non-linear devices will be described in detail to show how they are connected into the control system.

The secondary windings 18 and 19 of the transformer shown generally at 16 have their central points grounded at 20 and 21, respectively. The connections of these windings into the circuits will appear as the description proceeds.

The circuit for the gating winding 12 of the core 10 extends from one terminal of the secondary winding 18 of the transformer 16 through conductor 22, the winding 12, conductor 23, rectifier or diode 24, conductor 25 to ground at 26 through the non-linear device shown generally at 27. In operation, during one half cycle this circuit will drive the core 10 to positive saturation.

The non-linear device, shown generally at 27, comprises a resistor 28 connected through conductor 29 to the rectifier 30 and through conductor 31 to ground at 26. The end of the resistor 28 remote from the rectifier 30 is connected through conductor 32 to the battery 33 which is grounded at 34.

The energizing circuit for the gating winding 12 is traced through the non-linear device 27 since its functioning has been described hereinbefore. The circuits for the other windings will be traced through the non-linear devices as they occur without further reference to the functioning of the non-linear devices.

The circuit for the gating winding 14 extends from another terminal of the secondary winding 18 of the transformer 16 through conductor 35, the winding 14, rectifier 36, conductors 37 and 25 through the non-linear device 27 to ground at 26. In operation, during one half cycle the current flowing through the winding 14 will drive the core 11 to positive saturation while during the next half cycle the current flowing through the winding 12 will drive the core 10 to positive saturation. Thus, it will be seen that the cores 11 and 10 are driven to positive saturation alternately.

As pointed out hereinbefore, the cores 10 and 11 are also provided with reset windings 13 and 15, respectively. The circuit for the reset winding 13 extends from one terminal of the secondary winding 19 of the transformer 16 through conductor 38, the winding 13, conductor 39, rectifiers 40 and 41 connected by conductor 42, conductor 43, and to ground at 44 through the non-linear device shown generally at 45.

The non-linear device 45 comprises a resistor 46 connected through conductor 47 to the rectifier 48 which, in turn, is connected to the ground at 44 through conductor 49. The upper end of the resistor 46 is connected through conductor 32 to the negative terminal of the battery 33 which is grounded at 34.

The circuit for the reset winding 15 extends from the other terminal of the secondary winding 19 of the transformer 16 through conductor 50, the winding 15, conductor 51, rectifier 52, conductor 53, rectifier 54, conductor 55 to ground at 56 through the non-linear device shown generally at 57.

The non-linear device 57 comprises a resistor 58 connected through conductor 59 to rectifier 60 which is connected to the ground 56 through conductor 61. The upper end of the resistor 58 is connected through conductors 62 and 32 to the negative terminal of the battery 33 which, in turn, is grounded at 34.

The reset windings 13 and 15 are so connected that on one half cycle the winding 13 will drive the core 10 to negative saturation while on the next half cycle the winding 15 will drive the core 11 to negative saturation. Thus, the cores 10 and 11 are driven to negative saturation alternately by the reset windings 13 and 15.

In the flip-flop element the gating windings 12 and 14 and the reset windings 13 and 15 are so disposed that when the gating winding 12 drives the core 10 to positive saturation, reset winding 15 drives the core 11 to negative saturation. On the following half cycle the gating winding 14 will drive the core 11 to positive saturation and the reset winding 13 will drive the core 10 to negative saturation. Thus, I have a flip-flop element for a control system which when energized from the transformer, shown generally at 16, will on one half cycle drive the core 10 to positive saturation and the core 11 to negative saturation and on the following half cycle will drive the core 11 to positive saturation and the core 10 to negative saturation. If the circuits described hereinbefore are not subjected to other influences, the alternate magnetic saturations of the cores hereinbefore described will continue.

In order to deliver an output from the flip-flop element of the control system, terminals 63 and 64 are provided. In this embodiment of the invention the terminal 63 is connected through conductor 25, rectifier 24, conductor 23 to one terminal of the winding 12 of the core 10. The terminal 63 is also connected through conductors 25 and 37, rectifier 36, to a terminal of the winding 14. The terminal 64 is connected to ground at 26. As shown, a rectifier 30 is disposed between the terminals 63 and 64.

In order to build up an output across the terminals 63 and 64, provision must be made to prevent the functioning of the reset windings 13 and 15. In this embodiment of the invention in order to effect an initial building up of a voltage across the terminals 63 and 64 a signal is delivered through the terminal 65. This terminal is connected through conductor 66, rectifier 67 to the non-linear device 45 at the same point as the reset winding 13. The signal delivered at 65 will generally be direct current and of a voltage greater in magnitude than the voltage impressed across the winding 13. The signal delivered through the terminal 65 in this embodiment of the invention will be called the "on" signal. When the "on" signal is delivered it will block the flow of current through the rectifier 41.

If there were not an alternative path for the flow of current through the reset winding 13 this would block the functioning of the reset winding 13.

In this particular modification of the invention a conductor 75 is provided which connects the conductor 42 to the conductor 53. Therefore, in addition to the energizing circuit already traced for the reset winding 13, there is an alternative energizing circuit which may be traced from the same terminal of the secondary winding of the transformer 16 as the energizing circuit described hereinbefore through conductor 38, the reset winding 13, conductor 39, rectifier 40, conductors 75 and 53, rectifier 54 to ground through non-linear device 57. The rectifier 41 prevents the "on" signal from blocking the current flowing in this circuit.

Therefore, when an "on" signal is received through the terminal 65 it will not stop the normal functioning of the flip-flop element. The driving of the cores 10 and 11 to positive and negative saturation alternately will continue and no output voltage will be developed.

Another signal may be delivered through the terminal 68. This signal is designated the "hold" signal. The terminal 68 is connected through rectifier 69, conductor 70 to the non-linear device 57 at the same point as the energizing circuit for the reset winding 15. This signal opposes the current flowing through the winding 15. The voltage of the signal is of greater magnitude than the voltage across the winding 15 and blocks the flow of current. If the reset winding 15 did not have an alternate energizing circuit when a "hold" signal is delivered it would block the functioning of the reset winding 15. However, it will be noted that the reset winding 15 has an alternate energizing circuit which may be traced from one terminal of the secondary winding 19 of the transformer 16 through conductor 50, the reset winding 15, conductor 51, rectifier 52, conductors 75 and 42, rectifier 41, conductor 43 to the non-linear device 45 at the same point to which the "on" terminal signal 65 is connected.

Therefore, in the operation of the flip-flop element if only a "hold" signal is delivered the reset windings 13 and 15 will continue to function to drive the cores 10 and 11 to negative saturation alternately. Therefore, no output voltage will be delivered.

If both "on" and "hold" signals are delivered at the same time then the main energizing circuits and the alternate circuits for both reset windings will be blocked and the cores 10 and 11 will no longer be driven to negative saturation. Therefore, when the cores 10 and 11 are driven to positive saturation by the windings 12 and 14 on alternate half cycles, they will remain saturated. Consequently, on the next energization of the cores 12 and 14 the energy will not be utilized in driving the cores 10 and 11 to positive saturation but will function to build up an output voltage across the terminals 63 and 64. In this manner an output voltage is produced across the output terminals. The output voltage will be maintained after the initial building up as long as the "on" and "hold" signals are maintained.

A feedback circuit is provided for supplying a voltage to oppose the functioning of the reset winding 13 of the core 10 as long as an output voltage is maintained across the terminals 63 and 64. This feedback circuit extends from conductor 25 connected to terminal 63 then through conductor 71, rectifier 72, conductor 73, and conductor 43 to rectifier 41 where it blocks current flow through reset winding 13. Therefore, when the feedback circuit is energized by the development of an output voltage across the terminals 63 and 64, the "on" signal may be discontinued and an output voltage will be maintained as long as the "hold" signal continues to be delivered.

It has been found that even with the feedback circuit described hereinbefore, that due to leakage of the rectifiers and the fact that a perfect hysteresis loop for the core 10 is never obtained, that the flux in the core 10 will decay rapidly. Generally the positive saturation of the core 10 even with the feedback circuit will not last more than about twenty seconds after the signal received at 65 is discontinued.

When the positive saturation of the core 10 has decayed, the flip-flop circuit element can no longer deliver an output. In other words, it no longer stores a signal. Thus, the storing of a signal or the memory of the flip-flop element will only last until the positive flux in the core decays. In order to store signals for a predetermined length of time, circuits are provided for maintaining the positive saturation of cores 10 and 11 after an output has been built up across the terminals 63 and 64 through the positive saturation of cores 10 and 11.

The bias circuit for the core 10 extends from conductor 23 connected to terminal 63 through resistor 74, conductor 32, battery 33 to ground at 34. The resistor 74 may be designed to give an adequate current for maintaining the necessary saturation of the core 10 for maintaining voltage across the terminals 63 and 64 for one half cycle.

The bias circuit for the core 11 may be traced from one terminal of the secondary winding 18 of the transformer 16 through the winding 14 through the resistor 76, conductors 77 and 32 to the negative terminal of the battery 33 and ground at 34 back to the ground 20 of the transformer 16. This circuit will maintain the positive energization of the core 11 through the next half cycle. In such manner the positive energization of the cores 10 and 11 is maintained and a continuous output voltage is provided at the terminals 63 and 64.

From the foregoing it wil lbe evident that when "on" and "hold" signals are received at the same time an output voltage will be produced across the output terminals 63 and 64. When a voltage has been established at the output terminals of the flip-flop element the feedback circuit is energized and the "on" signal may be discontinued and a voltage will be maintained at the output terminals 63 and 64 through the cooperation of the circuits through the resistors 74 and 76 which will function to maintain the cores 10 and 11 positively saturated.

It will, therefore, be seen that when a flip-flop element having circuits for delivering "on" and "hold" signals is provided, a means is available for maintaining an output voltage after the "on" signal has been discontinued. Such a "hold" circuit may be highly desirable to give an operator control of the system. Assuming that a control system is set up to respond to an incoming "on" signal, it may not always be desirable to allow the control system to become inoperative upon the interruption of the "on" signal. Therefore, when the control system can be kept active by a "hold" signal, such as described hereinbefore, the operator may, after the initial development of the output voltage and the energization of the feedback circuit, maintain the flip-flop element actively energized.

In addition to enabling the operator to maintain a flip-flop element energized to deliver an output signal as desired, it may be desirable to provide control means for the operator to interrupt the output of the flip-flop element irrespective of the signals received or the circuits established and operating.

In the embodiment of the flip-flop element of a control system illustrated in Fig. 2, a circuit is provided for delivering an "off" signal to interrupt the output of the flip-flop circuit element illustrated. The flip-flop circuit element illustrated in Fig. 2 is identical with the flip-flop element illustrated in Fig. 1, with the exception of the circuitry disclosed for driving the cores 10 and 11 to negative saturation irrespective of the delivery of "on" and "hold" signals or the establishment of a feedback circuit and the delivery of a "hold" signal.

As shown in Fig. 2, the cores 10 and 11 are each provided with a third winding 78 and 79, respectively. These windings 78 and 79 will be so designed that when energized by an "off" signal delivered through the terminal 80 the cores 10 and 11 will be driven to negative saturation irrespective of the magnetization of the cores then existing. In other words, if the flip-flop element is receiving both "on" and "hold" signals and an output voltage is in existence at the output terminals 63 and 64, upon the receipt of an "off" signal at the terminal 80, the cores 10 and 11 will be driven to negative saturation. Therefore, the flip-flop element will not deliver an output.

The same will be true if a feedback circuit has been established and a "hold" signal is being delivered. In such case the cores 10 and 11 will be driven to negative saturation and the output voltage at the terminals 63 and 64 will be discontinued. The circuit for the winding 78 may be traced from the off terminal 80 through conductor 81, rectifier 82 and the non-linear device shown generally at 83.

The non-linear device 83 comprises resistor 84 connected through conductor 85 to the rectifier 86 and conductor 87 to ground at 88. The opposite end of the resistor 84 is connected through conductors 89 and 32 to the negative terminal of the battery 33 which, in turn, is connected to the ground at 34.

The energizing circuit for the winding 79 may be traced from the off terminal 80, conductors 81 and 90, rectifier 91, winding 79 and conductor 92 to ground through the non-linear device shown generally at 93. The non-linear device comprises a resistor 94 connected through conductor 95 to rectifier 96, conductor 87 to ground at 88. The other end of the resistor 94 is connected through conductors 97, 89 and 32 to the negative terminal of battery 33 which is grounded at 34. In this manner there is provided a signaling means which enables an operator to interrupt the output of the flip-flop circuit element at any time irrespective of the condition existing in the circuits and notwithstanding the fact that "on" and "hold" circuits are being received.

Since certain changes may be made in the above construction, and different embodiments of the invention may be made without departing from the scope thereof, it is intended that all matter contained in the above description or shown in the accompanying diagram shall be interpreted as illustrative and not in a limiting sense.

I claim as my invention:

1. In a flip-flop element of a control system, in combination, a plurality of cores, a plurality of windings on each core, a source of power, a gating circuit connecting one winding of each core to the source of power, a reset circuit connecting another winding of each core to the source of power, the gating circuits and the reset circuits being so connected that they drive the cores to positive and negative saturation alternately, circuit means for delivering an "on" signal to block one of the reset circuits, circuit means for delivering a "hold" signal to block the other reset circuit, and a feedback circuit connected to be energized when the flip-flop element of the control system delivers an output, the feedback circuit when energized being disposed to cooperate with the circuit means for delivering the "hold" signal to maintain the flip-flop element energized to deliver an output.

2. In a flip-flop element of a control system, in combination, a plurality of cores, a plurality of windings on each core, a source of power, a gating circuit connecting one winding of each core to the source of power, a reset circuit connecting another winding on each core to the source of power, the gating circuits and the reset circuits being so connected that they drive the cores to positive and negative saturation alternately, circuit means for delivering an "on" signal to one of the reset circuits, circuit means for delivering a "hold" signal to another reset circuit, the circuit means for delivering an "on" signal and the circuit means for delivering a "hold" signal cooperating to block the reset circuits whereby the gating circuits function to drive the cores to saturation and build up an output voltage to enable the flip-flop element to deliver an output.

3. In a flip-flop element of a control system, in combination, a plurality of cores, a plurality of windings on each core, a source of power, a gating circuit for connecting one winding of each core to the source of power, output terminals connected to the gating windings, a reset circuit connecting another winding of each core to the source of power, the gating circuits and the reset circuits being so connected that they drive the cores to positive and negative saturation alternately, circuit means for delivering an "on" signal to block one of the reset circuits, circuit means for delivering a "hold" signal to block the other reset circuit, and a feedback circuit disposed to be energized when the flip-flop element builds up an output voltage, the feedback circuit being connected to block the same reset circuit as the circuit means provided for delivering an "on" signal whereby a flip-flop element will remain energized after the "on" signal ceases to be delivered through said circuit means.

4. In a flip-flop element of a control system, in combination, a plurality of cores, a plurality of windings on each core, a source of alternating current power, a gating circuit connecting one winding of each core to the source of power, output terminals connected to the gating windings, a reset circuit connecting another winding of each core to the source of power, the gating circuits and the reset circuits being so connected that they drive the cores to positive and negative saturation alternately, circuit means for delivering an "on" signal to block one of the reset circuits, circuit means for delivering a "hold" signal to block the other reset circuit, the circuit means for delivering the "on" signal and the circuit means for delivering the "hold" signal cooperating to block the reset circuits whereby an output voltage is built up across the output terminals connected to the gating windings, a demagnetizing winding disposed on each of the cores, and circuit means for delivering a current to said demagnetizing windings to effect demagnetization of said cores and stop the delivery of an output by the flip-flop element irrespective of the state of magnetization of said cores.

5. In a flip-flop element of a control system, in combination, a plurality of cores, a plurality of windings on each core, a source of alternating current power, a gating circuit connecting one winding of each core to the source of power, output terminals connected to the gating windings, a reset circuit connecting another winding of each core to the source of power, the gating circuits and the reset circuits being so connected that they drive the cores to positive and negative saturation alternately, circuit means for delivering an "on" signal to block one of the reset circuits, circuit means for delivering a "hold" signal to block the other reset circuit whereby the magnetization of the cores effected through the gating circuits builds up a voltage across the output terminals, a feedback circuit connected between the output terminals of the flip-flop element and the circuit means for delivering an "on" signal to effect the blocking of a reset circuit as long as the output voltage is maintained across the output terminals, the circuit means for delivering an "on" signal and the circuit means for delivering a "hold" signal being so disposed that when energized at the same time they cooperate to effect the building up of an output voltage across the output terminals, and the feedback circuit and the circuit means for delivering a "hold" signal being so disposed that when there is an output voltage across the output terminals and the circuit means for delivering the "hold" signal is energized they cooperate to maintain an output voltage across the output terminals, demagnetizing windings disposed on each of the cores, and circuit means for delivering an "off" signal to the demagnetizing windings to effect the demagnetization of the cores and the driving of the output voltage across the output terminals to zero irrespective of the state of magnetization of the cores.

6. In a flip-flop circuit element for a control system, in combination, a plurality of cores, a plurality of windings on each core, a source of alternating current power, gating circuits connecting one winding of each core to the source of power, output terminals connected to the gating windings, reset circuits connecting another winding on each core to the source of power, the gating circuits and the reset circuits being so connected that they drive the cores to positive and negative saturation alternately, circuit means for delivering an "on" signal to block one reset circuit, circuit means for delivering a "hold" signal to block the other reset circuit whereby the magnetization of the cores effected through the gating circuits builds up a voltage across the output terminals, and means so connecting the reset circuits to one another that they cannot be blocked unless the "on" and "hold" signals are delivered at the same time.

7. In a flip-flop element of a control system, in combination, a plurality of cores, a plurality of windings on each core, a source of alternating current power, gating circuits connecting one winding of each core to the source of power, output terminals connected to the gating windings, reset circuits connecting another winding of each core to the source of power, the gating circuits and the reset circuits being so connected that they drive the cores to positive and negative saturation alternately, circuit means for delivering an "on" signal to block one of the reset circuits, circuit means for delivering a "hold" signal to block the other reset circuit whereby the magnetization of the cores effected through the gating circuits builds up a voltage across the output terminals when the "on" and "hold" signals are delivered at the same time, a plurality of rectifiers connected between each of the windings connected in the reset circuits and the terminals through which the "on" and "hold" signals are delivered, and a conductor connecting the reset circuits, the conductor being connected to each of the reset circuits at a point between a pair of rectifiers whereby the reset circuits are not blocked unless the "on" and "hold" signals are delivered at the same time.

8. In a flip-flop circuit element for a control system, in combination, a plurality of cores, a plurality of windings on each core, a source of alternating current power, gating circuits connecting one winding of each core to the source of power, output terminals connected to the gating windings, reset circuits connecting another winding of each core to the source of power, a plurality of rectifiers connected in each reset circuit on the side of the winding remote from the source of power, the gating circuits and the reset circuits being so connected that they drive the cores to positive and negative saturation alternately, circuit means for delivering an "on" signal to block one of the reset circuits, circuit means for delivering a "hold" signal to block the other reset circuit whereby the magnetization of the cores effected through the gating circuits builds up a voltage across the output terminals, a circuit connected between the reset windings, the circuit being connected to each of the reset windings at a point between the rectifiers to provide alternate energizing circuits whereby the reset circuits cannot be blocked by the delivery of an "on" or "hold" signal separately.

No references cited.